United States Patent
Asaumi et al.

(10) Patent No.: US 6,966,232 B2
(45) Date of Patent: Nov. 22, 2005

(54) TORQUE SENSOR

(75) Inventors: Hisao Asaumi, Wako (JP); Yasuo Shimizu, Wako (JP); Shunichiro Sueyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/727,828

(22) Filed: Dec. 4, 2003

(65) Prior Publication Data

US 2004/0107781 A1 Jun. 10, 2004

(30) Foreign Application Priority Data

Dec. 6, 2002 (JP) .............................. 2002-355732
Dec. 6, 2002 (JP) .............................. 2002-355733

(51) Int. Cl.$^7$ .............................................. G01L 3/02
(52) U.S. Cl. .................................................. 73/862.333
(58) Field of Search .................... 73/862.331, 862.332, 73/862.333, 862.335

(56) References Cited

U.S. PATENT DOCUMENTS

| | | | |
|---|---|---|---|
| 4,503,395 A | * | 3/1985 | Kratzer et al. ............... 324/253 |
| 4,750,371 A | * | 6/1988 | Kobayashi et al. ..... 73/862.336 |
| 4,779,260 A | * | 10/1988 | Kaneko et al. ............. 369/266 |
| 5,307,690 A | * | 5/1994 | Hanazawa ............. 73/862.333 |
| 6,386,052 B1 | | 5/2002 | Satoh et al. |
| 2002/0022912 A1 | | 2/2002 | Urabe et al. |

FOREIGN PATENT DOCUMENTS

| | | |
|---|---|---|
| JP | 59 107229 | 6/1984 |
| JP | 05 066164 | 3/1993 |
| JP | 2001 133336 | 3/2001 |

* cited by examiner

Primary Examiner—Max Noori
(74) Attorney, Agent, or Firm—Hamre, Schumann, Mueller & Larson, P.C.

(57) ABSTRACT

In a torque sensor having a magnetic metal film with magnetic anisotropy attached to a torque transmission shaft and an exciting coil and a detector coil each installed near the magnetic metal film, there is provided a reference voltage generator that supplies an ac excitation signal whose reference voltage indicating a midpoint of the ac excitation signal is set to a voltage corresponding to a 50% duty ratio of the ac excitation signal, to the exciting coil, such that a torque applied to the torque transmission shaft is detected based on an output of the detector coil, thereby achieving improved torque detection accuracy by enabling generation of an excitation signal of large amplitude that is free of upper-lower imbalance relative to the reference voltage as the midpoint and accurate detection of the magnitude and accuracy of detection waveform amplitude. In addition, the excitation signal is generated based on clock frequency of a microcomputer that detects the applied torque, thereby achieving improved torque detection accuracy by enabling generation of an excitation signal of large amplitude that is free of upper-lower imbalance relative to the reference voltage as the midpoint and accurate detection of the magnitude and accuracy of detection waveform amplitude.

15 Claims, 14 Drawing Sheets

TORQUE SENSOR

BACKGROUND OF THE INVENTION

1. Field of the Invention

This invention relates to a torque sensor, particularly to a contactless (non-contact) magnetostrictive torque sensor.

2. Description of the Related Art

The contactless magnetostrictive torque sensor generally comprises a magnetic metal film exhibiting uniaxial magnetic anisotropy (a magnetostrictive film) attached to a torque transmission shaft, and an exciting coil and detector coil installed near the magnetostrictive film. Changes in inductance owing to permeability fluctuation produced in the magnetostrictive film by the applied torque are detected by the detector coil as potential differences from which the magnitude of the applied torque is detected.

Specifically, as taught in Japanese Laid-Open Patent Application No. Hei 6 (1994)-221941 (e.g., in its FIGS. 4 to 6), the applied torque is detected by providing an excitation signal, more precisely an ac (alternating current) signal, such as a sine wave or triangular wave to the exciting coil and by sensing the magnitude and phase of the induced voltage waveform.

A torque sensor installed in a vehicle or the like is usually operated by a mono (positive or negative) power supply because such a power supply is lower in cost than a dual (positive and negative) power supply. In a torque sensor operated by a mono power supply, the reference voltage indicating the midpoint of the excitation signal or detection waveform amplitude is obtained by resistance-dividing a voltage supplied from a constant-voltage regulator or by further passing the so-obtained voltage through a separate constant-voltage regulator to convert it to a predetermined voltage.

In the torque sensor of the prior art, therefore, cases arise in which the reference voltage does not accurately indicate the midpoint of the excitation signal or detection waveform amplitude owing to error (fluctuation) occurring in the constant-voltage regulators and/or resistances. Since this makes it difficult to stably generate an excitation signal (ac signal) of large amplitude that is free of upper-lower imbalance (i.e., difference between the upper and lower sides of the amplitude divided by a reference voltage Vref as the midpoint), the conventional torque sensor has a problem of undependable torque detection accuracy. The fact that the magnitude and phase of the amplitude cannot be accurately detected unless the detection waveform midpoint is accurately indicated is another cause of undependable torque detection accuracy.

Aside from the above, a contactless magnetostrictive torque sensor of this type is taught, for instance, by Japanese Laid-Open Patent Application 2001-133337 (e.g., paragraph number 0027 and FIG. 2). This conventional torque sensor is used to detect steering torque input through a steering wheel by the operator in a vehicle electric power steering system that uses a motor to provide steering torque assistance.

Specifically, the steering torque detected by a torque sensor (70) is sent to a control means (81) of an electric power steering system and the control means (81) controls a motor (82) based on the input steering torque.

The excitation signal used by a torque sensor is generally a sine wave generated by an analog oscillator circuit, typically a Hartley or Colpitts oscillator. Such a torque sensor is easily affected by temperature changes, power supply voltage fluctuation and other such disturbances. Since the conventional torque sensor may therefore be unable to obtain a stable excitation signal (sine wave), it is liable to experience degraded torque detection accuracy.

Moreover, a torque sensor, particularly one according to the prior art discussed above that is used for detecting the torque of a vehicle torque transmission shaft, is preferably constantly monitored for abnormality of output by a control means consisting of a microcomputer, for example, so that failure of the torque sensor can be detected as soon as possible (at the most suitable time). However, the conventional torque sensor and the microcomputer or other control means used to monitor the torque sensor for abnormality thereof are constituted as separate systems (an analog signal system and a digital signal system) that operate independently at different frequencies. A delay therefore arises between the time at which the torque sensor produces an output and the time at which a microcomputer carries out troubleshooting based on the output.

On the other hand, the characteristics of the analog circuit that produces the excitation signal (particularly components thereof like the secondary bandpass filter for passing only a predetermined frequency) are liable to differ from one unit to the next owing to variance arising during production. The noise that comes to be included in the excitation signal when this happens lowers the torque detection accuracy.

SUMMARY OF THE INVENTION

Therefore, an object of this invention is to provide a torque sensor that supplies a reference voltage accurately indicating the excitation signal and detection waveform midpoints irrespective of error (voltage fluctuation) occurring in the excitation power supply, thereby achieving improved torque detection accuracy by enabling generation of an excitation signal of large amplitude that is free of upper-lower imbalance relative to the reference voltage as the midpoint and accurate detection of the magnitude and accuracy of detection waveform amplitude.

Another object of this invention is to provide a torque sensor that achieves improved torque detection accuracy by supplying a stable excitation signal and that eliminates delay between the time at which the torque sensor produces an output and the time at which a microcomputer carries out troubleshooting based on the output.

Still another object of this invention is to provide a torque sensor that achieves a further improvement in torque detection accuracy by generating a noise-free excitation signal irrespective of any deviation in the characteristics of the analog circuit that produces the excitation signal between different units owing to variance arising during production.

For achieving the first object, the invention provides, in one of its aspects, a torque sensor comprising: a magnetic metal film with magnetic anisotropy attached to a torque transmission shaft; an exciting coil and a detector coil each installed near the magnetic metal film; an excitation power supply source that generates an ac excitation signal to be supplied to the exciting coil; a reference voltage generator that is connected to the excitation power supply source to input the excitation signal and send the ac excitation signal whose reference voltage indicating a midpoint of the ac excitation signal is set to a voltage corresponding to a 50% duty ratio of the ac excitation signal, to the exciting coil; and a torque detector that is connected to the detector coil and detects a torque applied to the torque transmission shaft based on an output of the detector coil when the torque is applied;

For achieving the second and third objects, the invention provides, in one of its aspects, a torque sensor comprising: a magnetic metal film with magnetic anisotropy attached to a torque transmission shaft; an exciting coil and a detector coil each installed near the magnetic metal film; an excitation power supply source that supplies power for an excitation signal to be supplied to the exciting coil; a microcomputer that constitutes the torque detector; and an excitation signal generator that is connected to the excitation power supply source to input the power and generates the excitation signal from the power based on clock frequency of the microcomputer.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A torque sensor according to an embodiment of the present invention will now be explained with reference to the attached drawings.

Figure 1:
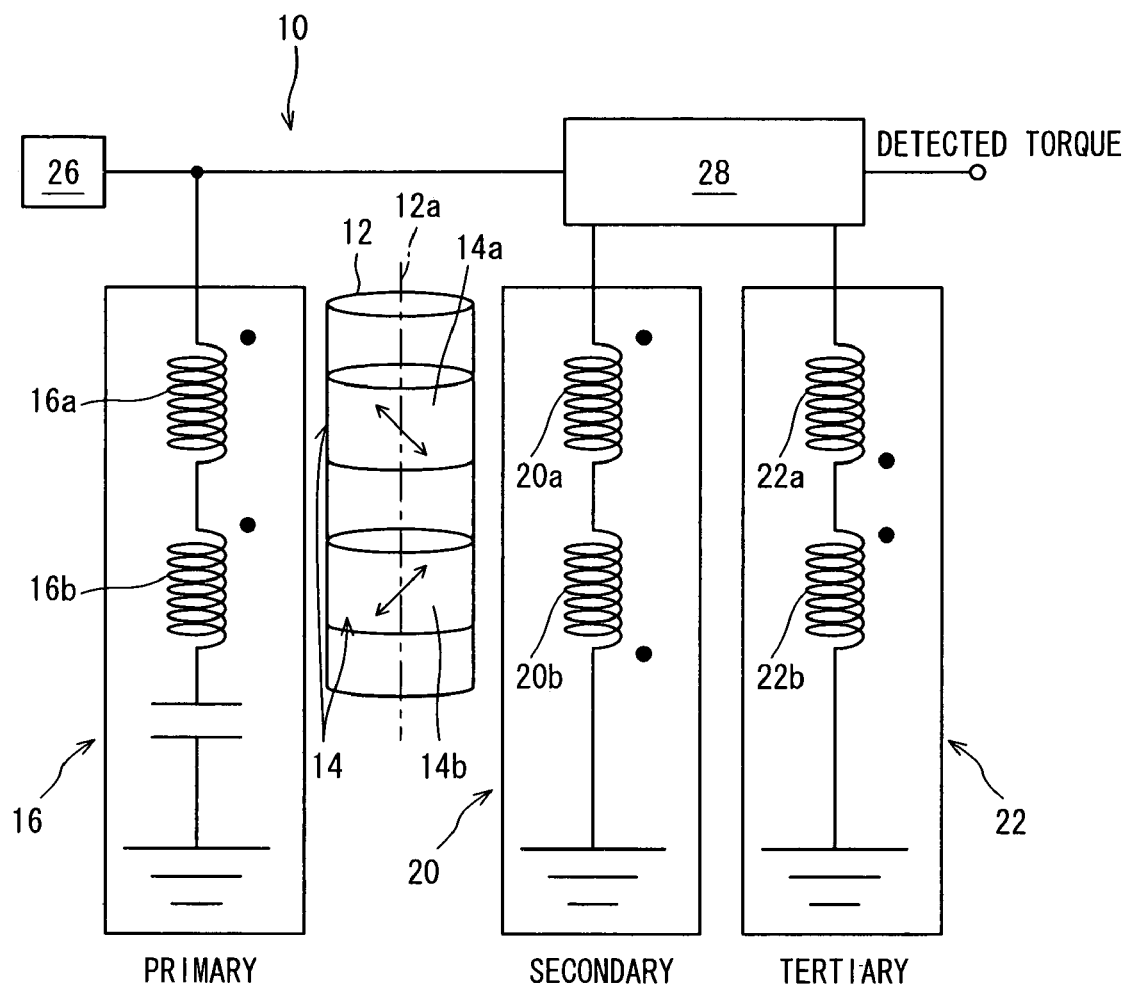
FIG. 1 is a schematic view illustrating the operating principle of a torque sensor according to an embodiment of this invention.

FIG. 1 is a schematic view illustrating the operating principle of a torque sensor according to an embodiment of this invention.

The torque sensor, designated by reference numeral 10 in the drawing, comprises a pair of magnetostrictive films 14 (magnetic metal films), an exciting coil (designated "primary") 16, a secondary detector coil 20 and a tertiary detector coil 22. The magnetostrictive films 14, which exhibit magnetic anisotropy, are attached to a torque transmission shaft (rotating shaft) 12, and the exciting coil 16 and detector coils 20, 22 are installed in close proximity thereto. In the following, the secondary detector coil 20 is called the "secondary detector coil" and the tertiary detector coil 22 is called the "tertiary detector coil."

The torque transmission shaft 12 is formed of a material such as chrome-molybdenum steel (JIS (Japanese Industrial Standard)-G-4105, designated SCM) that contains substantially no Ni. The magnetostrictive films 14 are constituted as a first magnetostrictive film 14a and a second magnetostrictive film 14b imparted with magnetic anisotropy.

As indicated by the double-headed arrows in the drawing, the first magnetostrictive film 14a and second magnetostrictive film 14b are constituted to exhibit uniaxial magnetic anisotropy in directions lying ±45 degrees relative to the axis 12a of the torque transmission shaft 12. They are fastened (bonded) to completely encircle the torque transmission shaft 12 over a prescribed width in the axial direction. The magnetostrictive films 14a, 14b are made of a magnetic film material whose permeability varies markedly with stress-strain (compressive stress and tensile stress). They are, for example, made of a Ni—Fe-system alloy film formed on the outer periphery of the torque transmission shaft 12 by a wet plating method. The Ni—Fe-system alloy film is, for instance, composed of 50 to 60 wt % of Ni and the balance of Fe.

The magnetostrictive films 14 can be provided directly on the periphery of the torque transmission shaft 12 as explained above or first be formed on a separate pipe-like member and then be attached to the torque transmission shaft 12 as carried on the separate member. It will be obvious to a person skilled in the art that the materials of the magnetostrictive films 14 and the torque transmission shaft 12 are not limited to those mentioned in the foregoing.

The exciting coil 16 is composed of a first exciting coil 16a and a second exciting coil 16b. The first exciting coil 16a and second exciting coil 16b are wound on a magnetic core (not shown) to be respectively located near the first magnetostrictive film 14a and second magnetostrictive film 14b (and torque transmission shaft 12), specifically to be spaced therefrom by a distance of around 0.4–0.6 mm, and are energized by application of an ac voltage from an exciting power source 26.

The secondary detector coil 20 is composed of a first secondary detector coil 20a and a second secondary detector coil 20b. Similarly to the first and second exciting coil 16a, 16b, the first secondary detector coil 20a and second secondary side detector coil 20b are respectively located near the first magnetostrictive film 14a and second magnetostrictive film 14b (and torque transmission shaft 12), specifically to be spaced therefrom by a distance of around 0.4–0.6 mm. The magnetic core of the exciting coil 16 and the magnetic core of the detector coil 20 are arranged to face each other from their locations near the magnetostrictive films 14 (torque transmission shaft 12). The first secondary detector coil 20a and the second secondary detector coil 20b are wound in opposite directions to be differentially connected, i.e., so that their negative voltage sides are differentially connected.

The tertiary detector coil 22 is composed of a first tertiary detector coil 22a and a second tertiary detector coil 22b, which are respectively located near the first magnetostrictive film 14a and second magnetostrictive film 14b (and torque transmission shaft 12), specifically to be spaced therefrom by a distance of around 0.4–0.6 mm. The first tertiary detector coil 22a and the second tertiary detector coil 22b are wound in opposite directions to be differentially connected, i.e., so that their positive voltage sides are differentially connected.

The first tertiary detector coil 22a is wound in the opposite direction from the first secondary detector coil 20a and given different polarity, while the second tertiary detector coil 22b is wound in the opposite direction from the second secondary detector coil 20b and given different polarity.

The torque sensor 10 according to this embodiment is thus equipped with a total of four detector coils arranged so that the winding directions of those connected to each other and those located near the same magnetostrictive film are opposite (counter-wound).

A magnetic circuit is formed between the torque transmission shaft 12 (and magnetic metal films 14) and the magnetic cores. When the exciting coil 16 is excited, the permeability in this magnetic circuit increases/decreases in proportion to stress-strain arising in the torque transmission shaft 12 in response to torque applied from the exterior. The induced voltage produced across the output terminals of the secondary detector coils 20, 22 by the increase or decrease is output as small change in voltage value.

The outputs of the secondary detector coil 20 and tertiary detector coil 22 are extracted through a processing circuit 28. As explained later, the processing circuit 28 detects, and produces outputs representing, the direction and magnitude of the applied torque.

The torque sensor 10 according to this embodiment will now be explained in detail taking as an example the case where it is installed in an electric power steering system for boosting vehicle steering torque and used as a torque sensor for detecting steering torque input by the operator.

Figure 2:
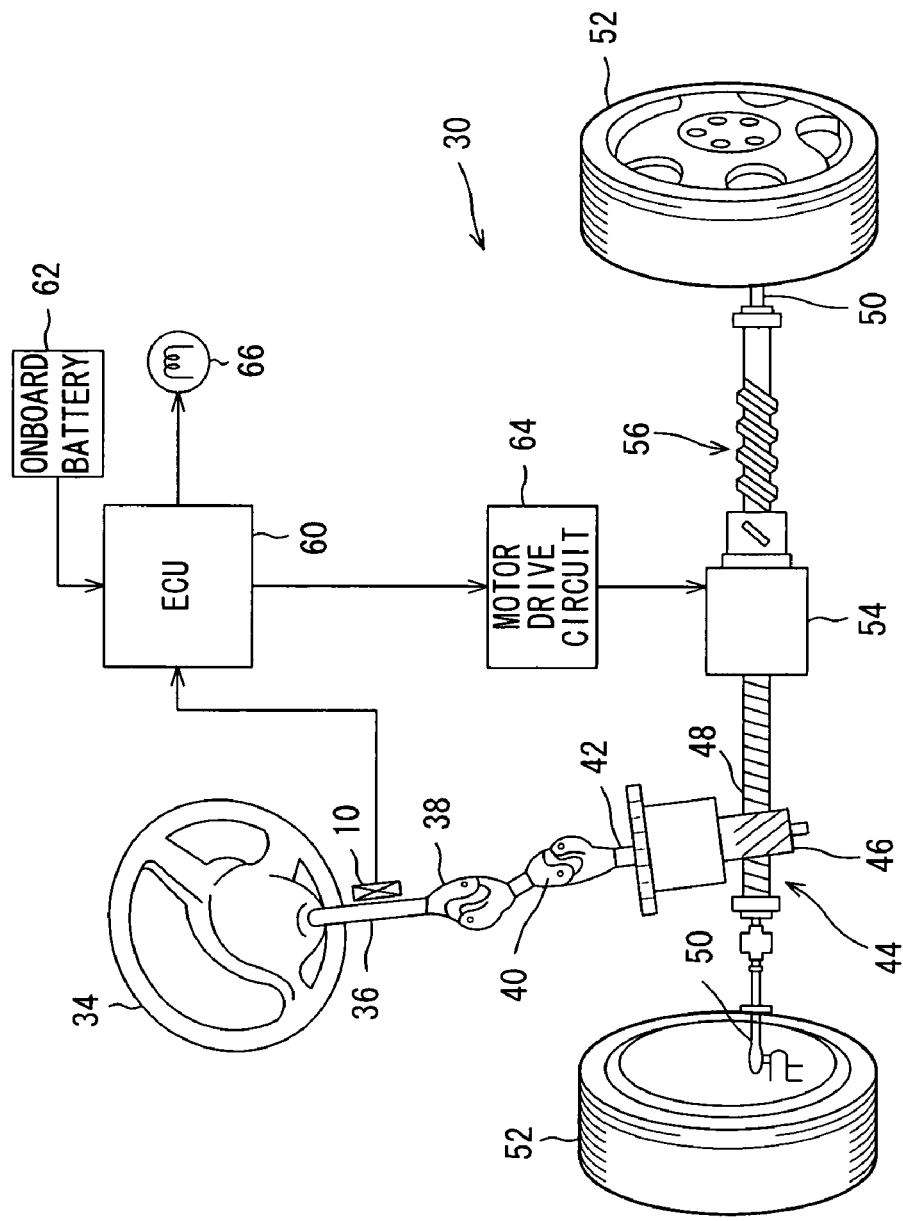
FIG. 2 is an explanatory diagram showing the torque sensor used as the torque sensor for detecting the steering torque of an electric power steering system.

FIG. 2 is an explanatory diagram showing the torque sensor 10 used as the torque sensor for detecting the steering torque of an electric power steering system.

As shown in the drawing, a steering wheel 34 located at the operator's seat of a vehicle 30 is connected to a steering shaft 36 that is connected to a connecting shaft 42 through universal joints 38, 40.

The connecting shaft 42 is connected to the pinion 46 of a rack-and-pinion steering gear 44. The pinion 46 is meshed with the rack 48 of the steering gear 44 so that rotational motion input from the steering wheel 34 is transmitted through the pinion 46 to be converted into reciprocal motion of the rack 48 for steering two front wheels 52 (steered wheels) in a desired direction through tie rods (steering rods) 50 and kingpins (not shown) installed at opposite ends of the front axle.

An electric motor 54 and a ball screw mechanism 56 are installed coaxially on the rack 48. The motor output is transmitted through the ball screw mechanism 56 to be converted into reciprocal motion of the rack 48, thereby driving the rack 48 in the direction that assists (i.e., decreases) the steering torque (or steering force) input through the steering wheel 34.

The torque sensor 10 is installed at a suitable location near the steering shaft 36 and outputs a signal representing the direction and magnitude of the steering torque (steering force) input by the operator.

The output of the torque sensor 10 is sent to an ECU (Electronic Control Unit) 60 of the electric power steering system. The ECU 60 is a microcomputer powered by an onboard battery (12V mono power supply) 62 to operate at a prescribed clock frequency.

The ECU 60 uses the direction and magnitude of the steering torque detected by the torque sensor 10 and a signal representing the vehicle speed supplied from another ECU (not shown) to decide the amount and direction of steering torque assist, uses the decided amount and direction to calculate a command value (as a Pulse Width Modulation duty ratio), and outputs the calculated command value to a motor drive circuit 64 to control the motor 54. The steering torque detection accuracy of the torque sensor 10 therefore affects the feel of the power steering.

The ECU 60 also uses the output of the torque sensor 10 to detect failure of the torque sensor 10 and lights a warning lamp 66 installed near the operator's seat to alert the operator when a failure is detected.

Figure 3:
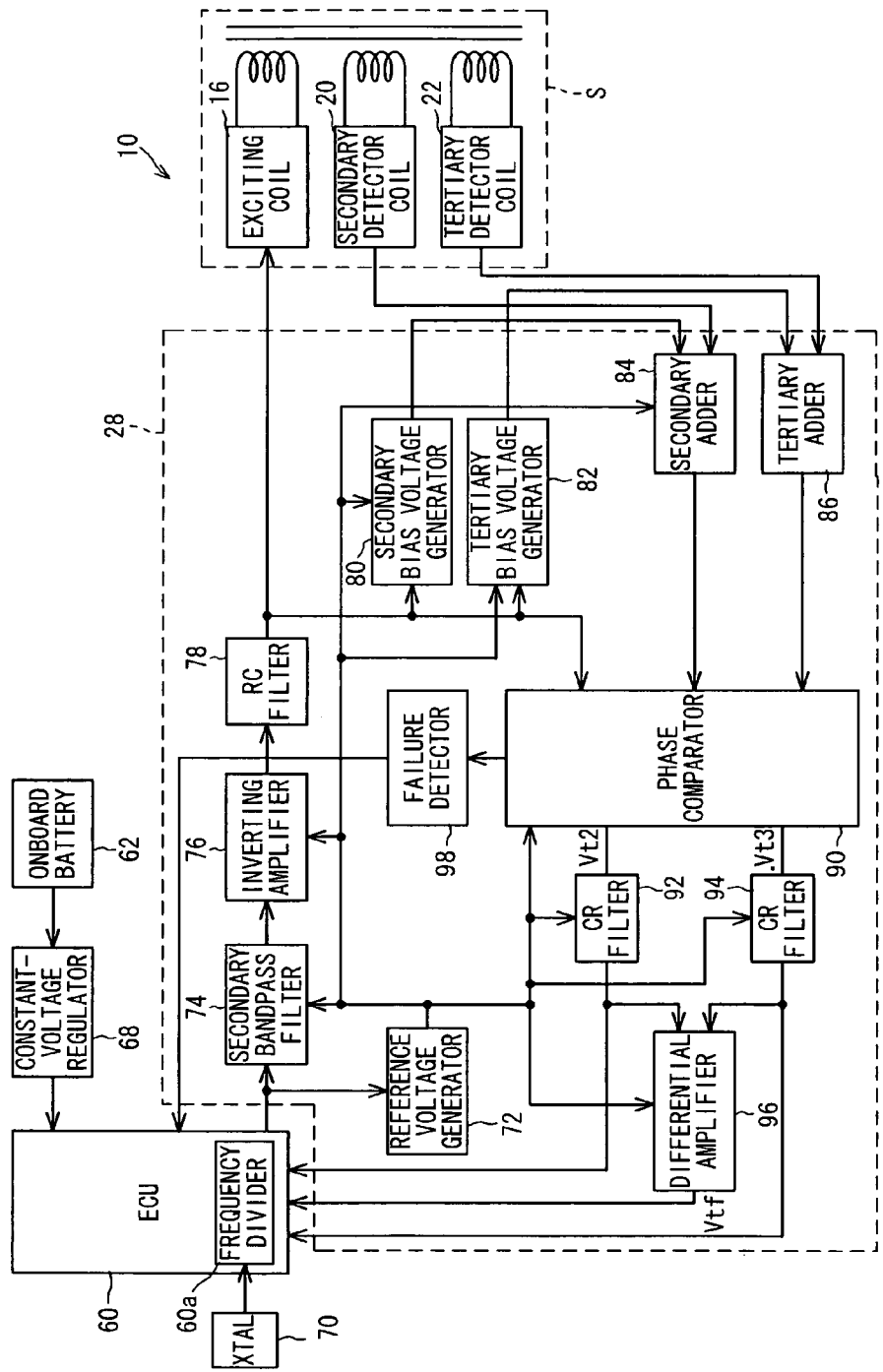
FIG. 3 is a block diagram showing the structure of the torque sensor in detail.

FIG. 3 is a block diagram showing the structure of the torque sensor 10 in detail.

As illustrated, the ECU 60 is connected to the onboard battery 62 through a 5V constant-voltage regulator 68 to be supplied with 5V operating voltage. The clock frequency of the ECU 60 (operating frequency; more specifically, the internal frequency of the microcomputer constituting the CPU) is obtained by internally multiplying the oscillating frequency (external frequency) of a crystal oscillator 70 a prescribed number of times. In this embodiment, the oscillating frequency of the crystal oscillator 70 is 10 MHz and the ECU 60 internally multiplies this frequency by four. The ECU 60 uses the supplied 5V operating voltage to generate a square wave of an amplitude of 5 V and frequency of 40 MHz.

The ECU 60 is equipped with an internal frequency divider (circuit) 60a. The frequency divider 60a is equipped with a counter (not shown) for counting the clock frequency of the ECU 60 and is capable of changing a predetermined count value in response to a program instruction received from the outside so as to set the frequency division ratio to a desired value, i.e., variable. In this embodiment, the count value is set at 1,600 to obtain a frequency division ratio of 1/1,600. The frequency divider 60a therefore outputs a 25 kHz square wave of 5V amplitude.

The output of the frequency divider 60a is input to a reference voltage generator 72. As termed in this specification, "reference voltage" means a voltage value indicating the midpoint (amplitude midpoint) of an ac signal generated in the processing circuit 28. The reference voltage generator 72 outputs a voltage corresponding to a 50% duty ratio of the square wave of 5V amplitude output by the frequency divider 60a, i.e., a constant reference voltage of 2.5 V. Thus, the reference voltage generator 72 that is connected to the excitation power supply source to inputs the excitation signal and sends the ac excitation signal whose reference voltage indicating a midpoint of the ac excitation signal is set to a voltage corresponding to a 50% duty ratio of the ac excitation signal, to the exciting coil.

The 25 kHz square wave output by the frequency divider 60a is also input to a secondary bandpass filter 74 that removes (attenuates) high harmonic components of a frequency other than that of the square wave (25 kHz). The secondary bandpass filter 74 is also input with the reference voltage generated in the reference voltage generator 72 and therefore generates a 25 kHz sine wave of an amplitude of 5 V and a midpoint of 2.5 V.

The sine wave generated in the secondary bandpass filter 74 is subjected to waveform inversion and amplitude amplification in an inverting amplifier (operational amplifier) 76 such that the midpoint of the so-processed sine wave is also made the aforesaid reference voltage. The processed sine wave is supplied through an RC filter (low-pass filter) 78 to the exciting coil 16 (i.e., the first exciting coil 16a and the second exciting coil 16b connected thereto) as an excitation signal. Upon supply of the excitation signal to the exciting coil 16, the secondary detector coil 20 and tertiary detector coil 22 produce phase outputs (voltage waveforms) corresponding to the direction and magnitude of the steering torque applied to the steering shaft 36 (not shown in FIG. 3).

As explained in the foregoing, the sine wave constituting the excitation signal in this embodiment is generated from the waveform obtained by dividing the square wave output by the ECU 60 and is thus generated from a digital signal. This makes it possible to supply a stable excitation signal that is minimally affected by temperature change and power supply voltage fluctuation. The torque detection accuracy is therefore improved because the waveforms output by the secondary detector coil 20 and tertiary detector coil 22 are also stable. Thanks to the resulting accurate detection of the steering torque applied through the steering wheel 34 by the operator, the feel of the power steering is enhanced.

If the characteristics of the secondary bandpass filter 74, inverting amplifier 76, RC filter 78 or any of the other analog circuit components used to generate the excitation signal should differ from those according to the design specifications (owing to variance arising during production), the frequency of the square wave input to the analog circuit can be set to a value appropriate for the actual analog circuit characteristics, particularly the time constant of the secondary bandpass filter 74, by changing the set counter value (count) and thus changing the frequency division ratio of the frequency divider 60a. The change of the counter value is effected by a program instruction input from the outside. This makes it possible to generate a noise-free excitation signal (sine wave) despite any deviation of the analog circuit characteristics from the specified values. The torque detection accuracy is enhanced in proportion.

Figure 4:
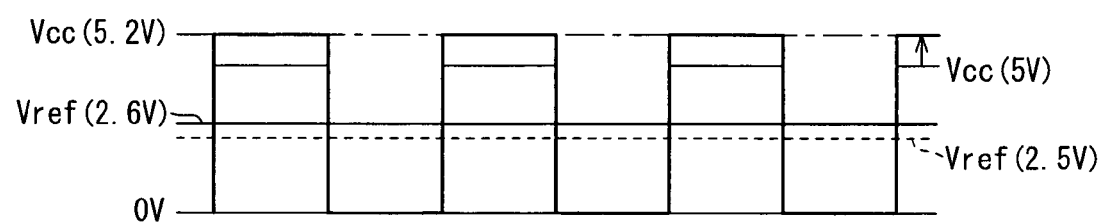
FIG. 4 is an explanatory view showing a reference voltage of the torque sensor.

As can be seen from FIG. 4, owing to the fact that the reference voltage indicating the midpoint of the sine wave (excitation signal) is set at a voltage corresponding to a 50% duty ratio of the square wave, the reference voltage Vref indicating the midpoint of the amplitude of the sine wave changes to follow any change in sine wave amplitude that might arise due to fluctuation of the voltage Vcc supplied from the excitation power supply. If the voltage Vcc of the excitation power supply should become 5.2 V, for instance, the reference voltage Vref becomes 50% of that value or 2.6 V.

Even in the case of using a mono power supply such as the onboard battery 62 to generate the excitation signal, therefore, a large-amplitude excitation signal can be generated that is constantly free of upper-lower imbalance (difference between the upper side amplitude and lower side amplitude divided by the reference voltage Vref as the midpoint). In other words, the excitation signal can be generated using the maximum voltage supplied by the excitation power supply. In the configuration of FIG. 3, the excitation power supply is constituted by the constituent elements from the onboard battery 62 to the frequency divider 60a, i.e., the onboard battery 62, constant-voltage regulator 68, ECU 60 and frequency divider 60a.

Figure 5:
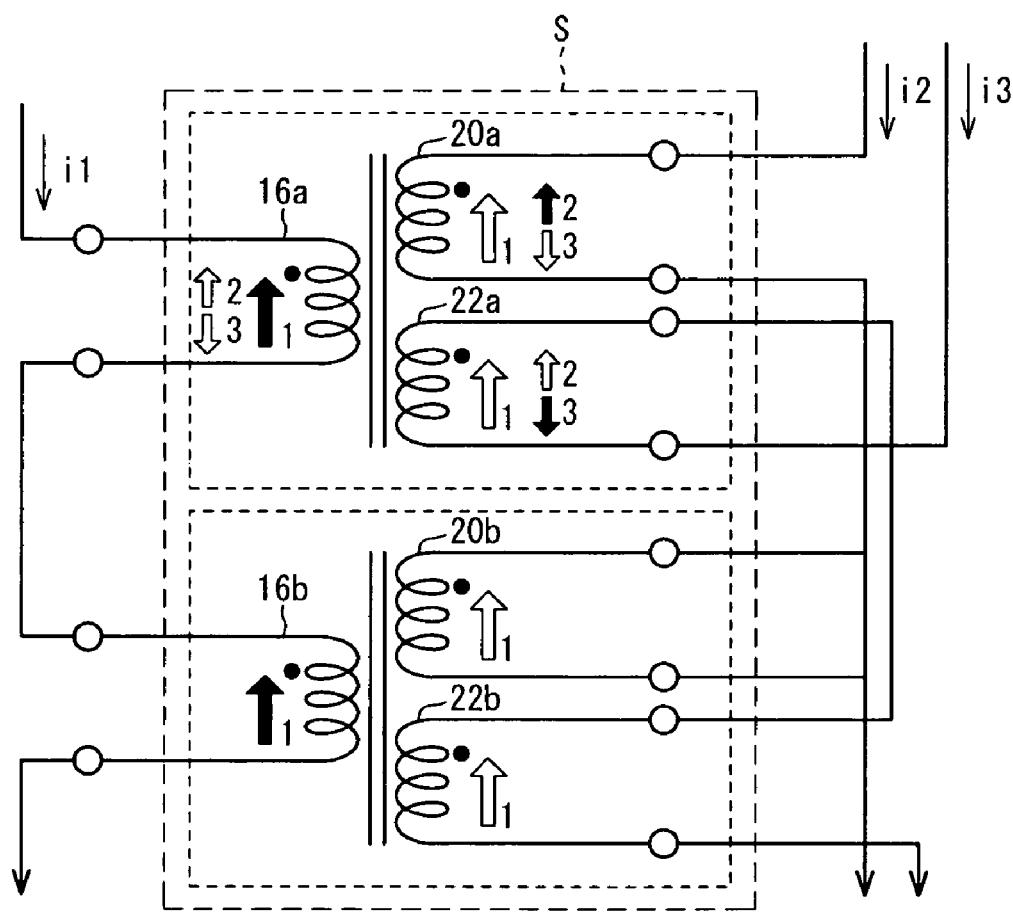
FIG. 5 is an enlarged view of a sensing section of the torque sensor designated by reference symbol S in FIG. 3.

The secondary detector coil 20 and tertiary detector coil 22 will now be explained in detail with reference to FIG. 5. FIG. 5 is an enlargement of the sensing section designated by reference symbol S in FIG. 3. The sensing section S is composed of the exciting coil 16, the secondary detector coil 20, the tertiary detector coil 22 and the steering shaft 36 (and the magnetostrictive films 14 attached thereto). (The steering shaft 36 and magnetostrictive films 14 are not shown in FIGS. 3 and 5.)

As shown in FIG. 5, the first secondary detector coil 20a and first tertiary detector coil 22a are installed at locations near the first exciting coil 16a. As explained earlier, the first secondary detector coil 20a and first tertiary detector coil 22a are wound in opposite directions (counter-wound) and given different polarity. Specifically, the first exciting coil 16a and secondary detector coil 20 are given the same polarity and the first exciting coil 16a and first tertiary detector coil 22a are given different polarity.

The second secondary detector coil 20b and second tertiary detector coil 22b are installed at locations near the second exciting coil 16b. As explained earlier, the second secondary detector coil 20b and second tertiary detector coil 22b are also wound in opposite directions (counter-wound) and given different polarity. Specifically, the second exciting coil 16b and second secondary detector coil 20b are given different polarity and the second exciting coil 16b and second tertiary detector coil 22b are given the same polarity.

As illustrated, the first exciting coil 16a and second exciting coil 16b are in series connection with the negative voltage side of the former connected to the positive voltage side of the latter. The first secondary detector coil 20a and second secondary detector coil 20b are in differential series connection with their negative voltage sides connected to each other. The first tertiary detector coil 22a and second tertiary detector coil 22b are in differential series connection with at their positive voltage sides connected to each other.

The induced voltages produced in the coils will be explained. The black arrows in the drawing designate self-induced voltages and the white arrows designate mutually induced voltages. The numeral (1, 2 or 3) assigned to each arrow indicates that the induced voltage is produced by the electromotive force of (1) an exciting coil, (2) a secondary detector coil or (3) a tertiary detector coil.

The first coils assigned the reference symbol a (16a, 20a and 22a) will be explained by way of example. When the first exciting coil 16a is supplied with an excitation signal to apply a voltage thereto, a current i1 flows through the first exciting coil 16a and a self-induced voltage is produced in the direction opposite to the current flow. At the same time, mutually induced voltages are produced in the first secondary detector coil 20a and first tertiary detector coil 22a.

When induced voltages are produced in the first secondary detector coil 20a and first tertiary detector coil 22a, currents (induced currents) i2 and i3 are produced in these coils and the produced currents produce self-induced voltages in the opposite direction. The self-induced voltages produced in the first secondary detector coil 20a and first tertiary detector coil 22a produce a mutually induced voltage in the first exciting coil 16a, whereby the apparent inductance of the first exciting coil 16a changes (the flow of current therein changes).

However, in this embodiment, the first secondary detector coil 20a and the first tertiary detector coil 22a are wound in opposite directions (counter-wound), so that the currents flowing through the two coils are 180 degrees out of phase and their self-induced voltages counteract. Therefore, if i2=i3, the self-induced voltages produced in the first secondary detector coil 20a and first tertiary detector coil 22a cancel each other to become zero, and the mutually induced voltages they produce in the first exciting coil 16a also cancel out to become zero.

Thus, as shown taking the second coils assigned the reference symbol b (16b, 20b and 22b) by way of example, the only induced voltages produced in the coils are the self-induced voltage of the exciting coil 16 and the mutually induced voltages that this self-induced voltage produces in the secondary detector coil 20 and tertiary detector coil 22. In other words, no change in the inductance of the exciting coil 16 is produced owing to the self-induced voltages of the detector coils 20, 22, whereby the outputs of the detector coils 20, 22 are values solely reflecting the applied torque.

Since the coils of the secondary detector coil 20 and the tertiary detector coil 22 are wound in opposite directions (counter-wound) in the aforesaid manner, the self-induced voltages of the detector coils 20, 22 and the mutually induced voltages that they produce in the exciting coil 16 cancel out so that the inductance of the exciting coil 16 is unchanged. The outputs of the detector coils 20, 22 are therefore proportional to the applied torque and the torque detection accuracy is enhanced.

Change in inductance owing to temperature change will now be discussed. As explained in the foregoing, the first secondary detector coil 20a and second secondary detector coil 20b are in differential series connection with their negative voltage sides connected to each other. Any changes in the inductances of the first and second secondary detector coils 20a, 20b owing to temperature change therefore cancel out to leave the overall inductance of the secondary detector coil 20 unchanged. Further, the first tertiary detector coil 22a and second tertiary detector coil 22b of the tertiary detector coil 22 are in differential series connection with their positive voltage sides connected to each other, so that changes in their inductances similarly cancel each other to become zero.

Moreover, owing to the fact that the first secondary detector coil 20a and second secondary detector coil 20b are in negative-to-negative differential connection and the first tertiary detector coil 22a and second tertiary detector coil 22b are in positive-to-positive differential connection, the torque sensor 10 can maintain a stable detection characteristic even when installed in an electric power steering system and exposed to considerable temperature change because any changes in inductance caused by temperature fluctuation cancel out and their impact is eliminated. The steering torque that the operator applies through the steering wheel 34 can therefore be accurately detected to further enhance the feel of the power steering.

The explanation of FIG. 3 will be continued. The excitation signal output from the RC filter 78, more specifically the voltage waveform actually supplied to the exciting coil 16, is input to a secondary bias voltage generator 80 that generates a secondary cosine wave whose phase is advanced 90 degrees. The excitation signal (the voltage waveform actually input to the exciting coil 16) is also input to a tertiary bias voltage generator 82 that generates a tertiary cosine wave whose phase is delayed 90 degrees (advanced −90 degrees).

The output (voltage waveform) of the secondary detector coil 20 is added to the secondary cosine wave in a secondary adder 84, thereby producing a secondary added waveform. The output (voltage waveform) of the tertiary detector coil 22 is added to the tertiary cosine wave in a tertiary adder 86, thereby producing a tertiary added waveform. In other words, the secondary cosine wave and tertiary cosine wave amount to bias voltages added to the voltage waveforms of the detector coils.

Figure 6:
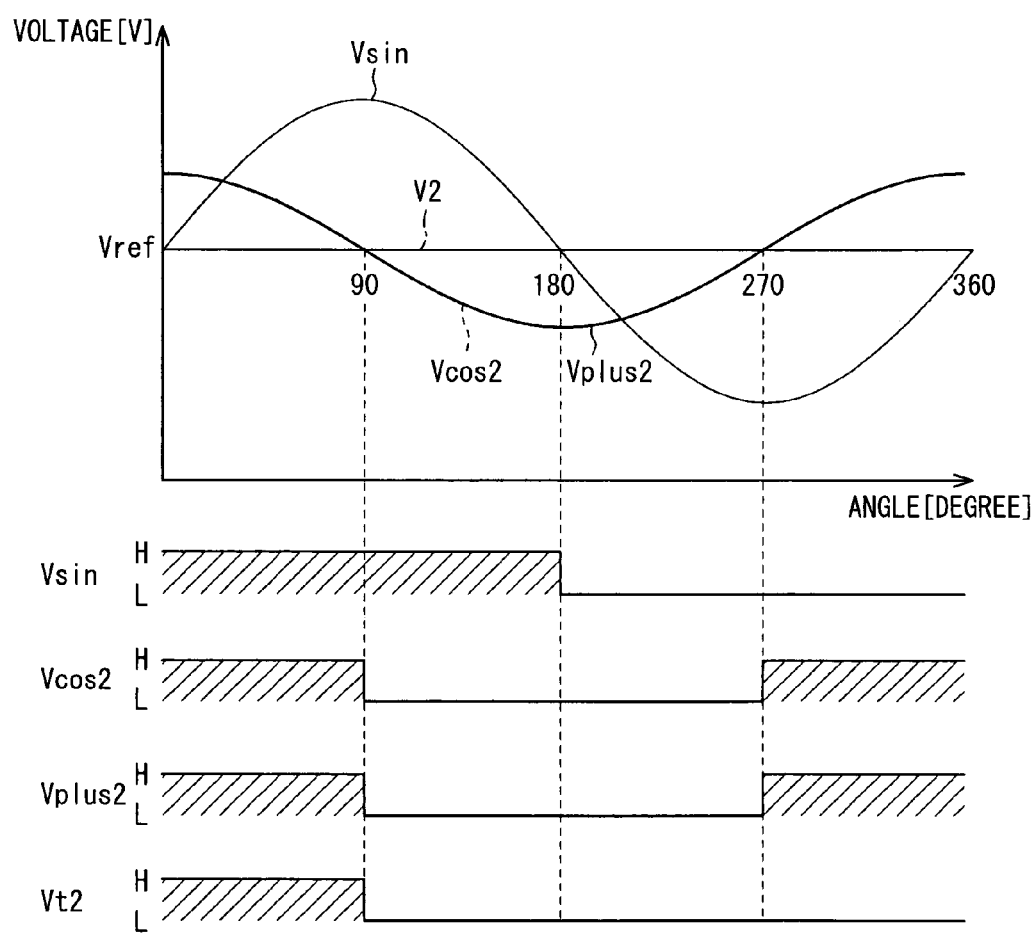
FIG. 6 is an explanatory graph showing the secondary added waveform and other waveforms when no torque is applied to the torque transmission shaft (steering shaft)
Figure 7:
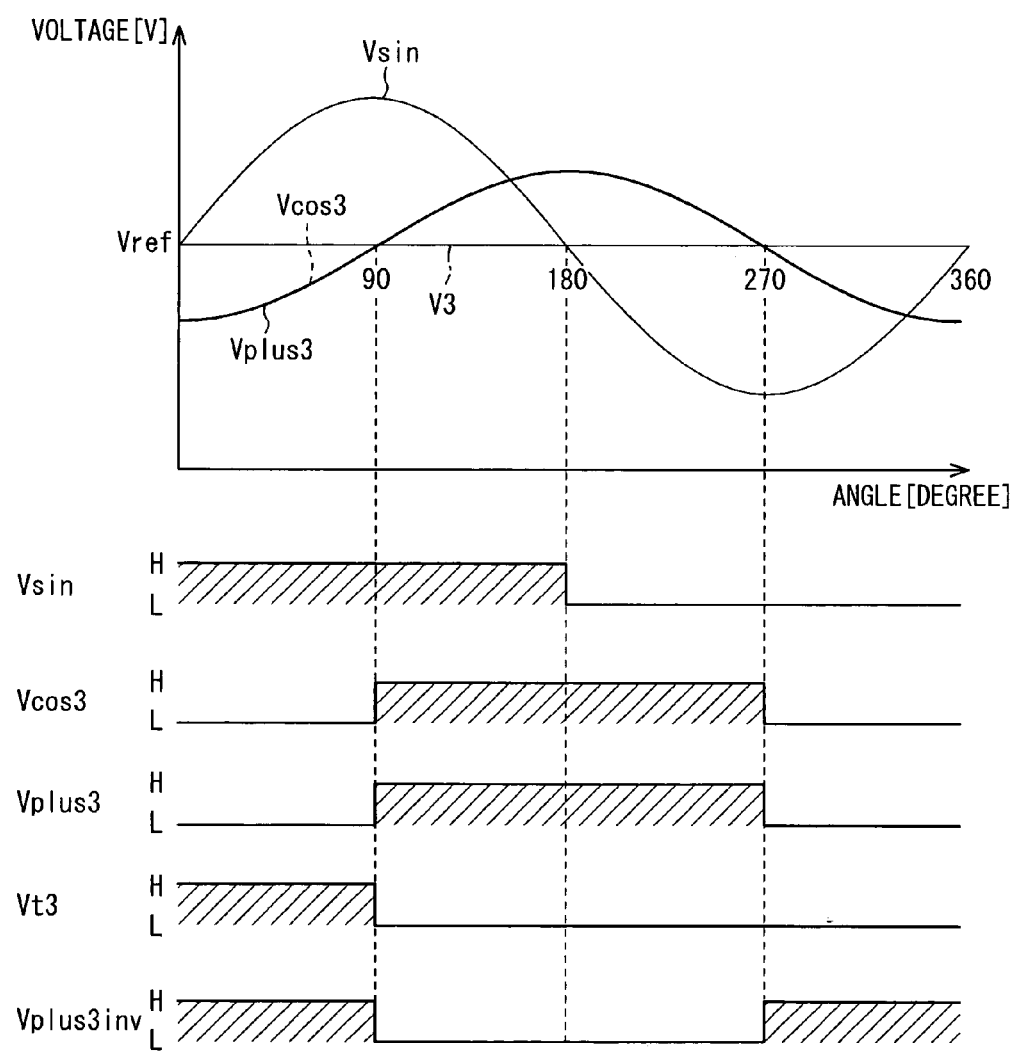
FIG. 7 is an explanatory graph showing the tertiary added waveform and other waveforms also when no torque is applied to the torque transmission shaft (steering shaft)

FIG. 6 is an explanatory graph showing the secondary added waveform and other waveforms when no torque is applied to the steering shaft 36. FIG. 7 is an explanatory graph showing the tertiary added waveform and other waveforms also when no torque is applied to the steering shaft 36.

As shown in FIG. 6, when no torque is applied to the steering shaft 36, the outputs of the first secondary detector coil 20a and second secondary detector coil 20b cancel each other and the overall output of the secondary detector coil 20 (hereinafter called the "secondary output"), designated V2, coincides with the reference voltage Vref (becomes zero). The secondary added waveform, designated Vplus2, therefore coincides with the secondary cosine wave, designated Vcos2. The excitation signal (sine wave) actually supplied to the exciting coil 16 is designated Vsin.

As shown in FIG. 7, when no torque is applied to the steering shaft 36, the outputs of the first tertiary detector coil 22a and second tertiary detector coil 22b cancel each other and the overall output of the tertiary detector coil 22 (hereinafter called the "tertiary output"), designated V3, coincides with the reference voltage Vref (becomes zero). The tertiary added waveform, designated Vplus3, therefore coincides with the tertiary cosine wave, designated Vcos3.

Figure 8:
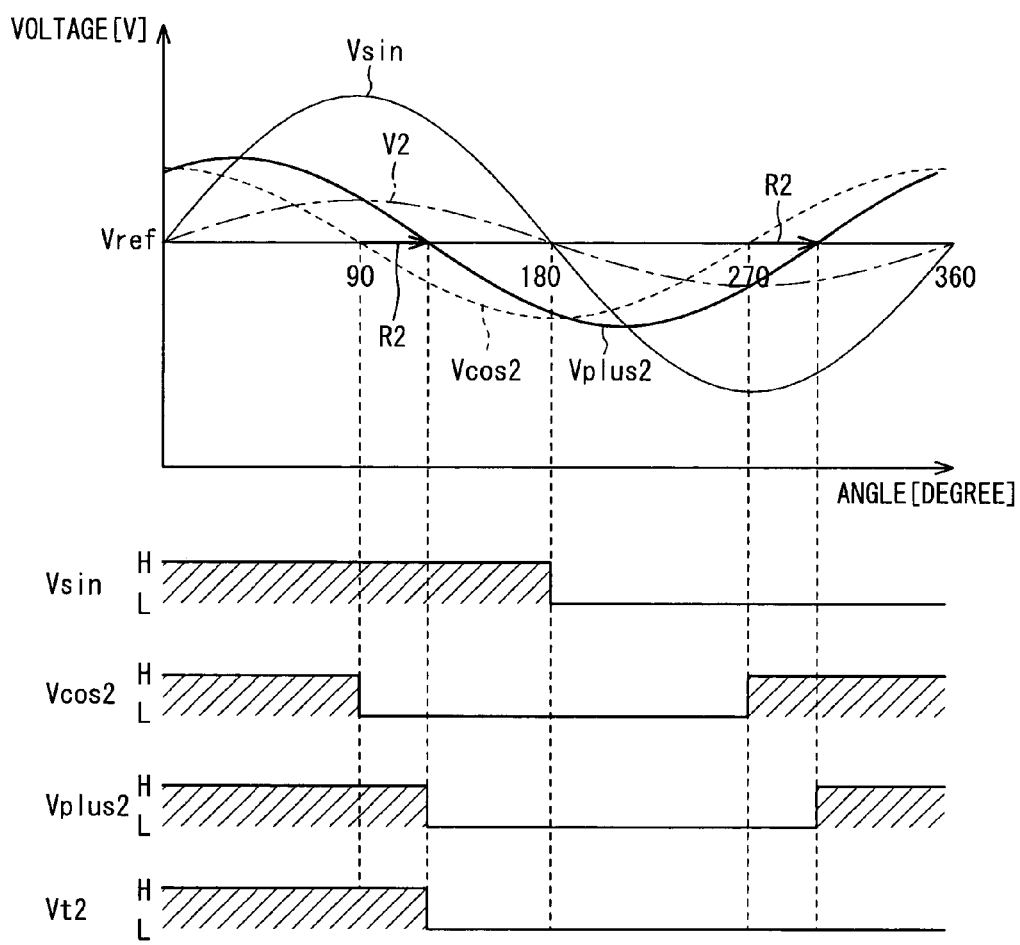
FIG. 8 is an explanatory graph showing the secondary added waveform and other waveforms when clockwise torque is applied to the torque transmission shaft (steering shaft)

When clockwise torque is applied to the steering shaft 36, the inductances of the first secondary detector coil 20a and second secondary detector coil 20b are thrown out of balance so that, as shown in FIG. 8, the secondary output V2 is produced in phase with the excitation signal Vsin. As a result, the phase of the secondary added waveform Vplus2 is shifted in the delay direction relative to the secondary cosine wave Vcos2. The phase difference of the secondary added waveform Vplus2 relative to the secondary cosine wave Vcos2 when clockwise torque is applied to the steering shaft 36 (phase difference when both equal reference voltage Vref) is designated R2.

Figure 9:
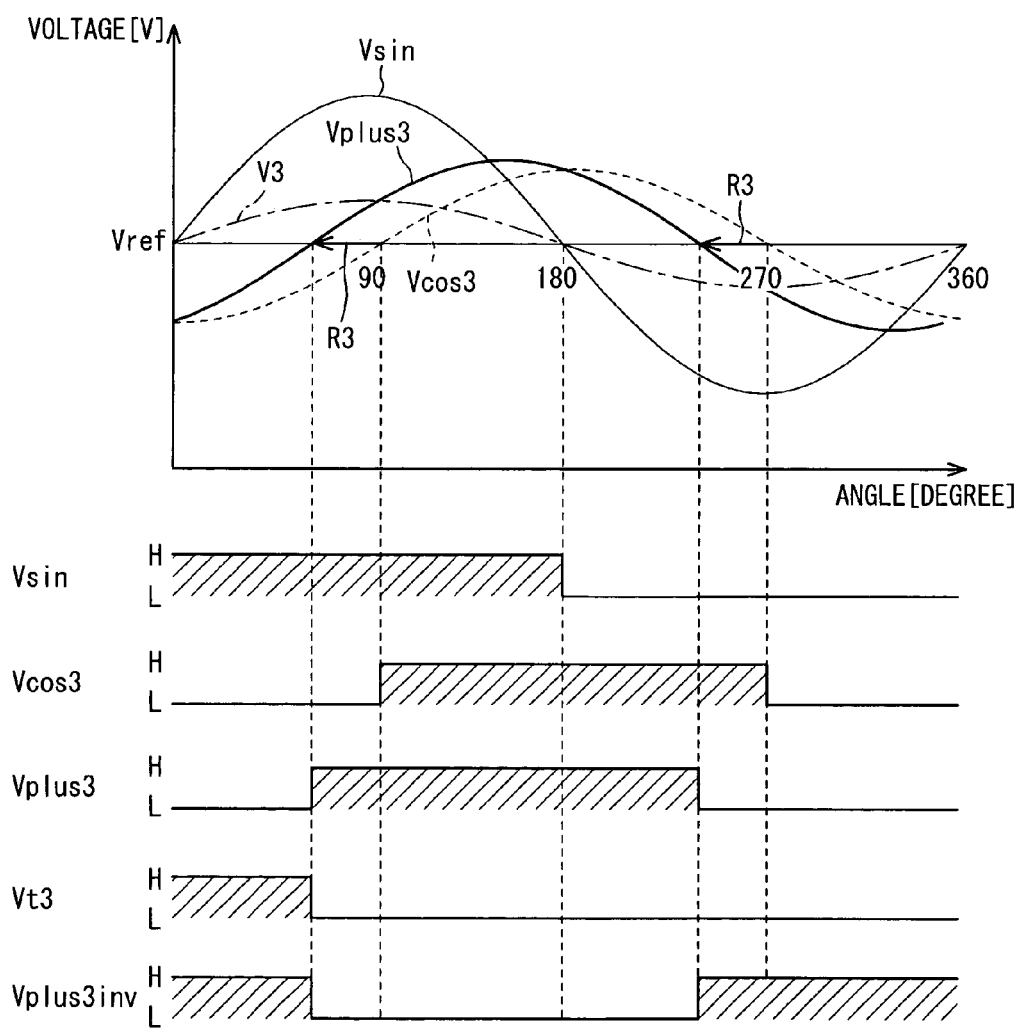
FIG. 9 is an explanatory graph showing the tertiary added waveform and other waveforms also when clockwise torque is applied to the torque transmission shaft (steering shaft)

The inductances of the first tertiary detector coil 22a and second tertiary detector coil 22b of the tertiary detector coil 22 are similarly thrown out of balance so that, as shown in FIG. 9, the tertiary output V3 is produced in phase with the excitation signal Vsin. As a result, the phase of the tertiary added waveform Vplus3 is shifted in the advance direction relative to the tertiary cosine wave Vcos3. The phase difference of the tertiary added waveform Vplus3 relative to the tertiary cosine wave Vcos3 when clockwise torque is applied to the steering shaft 36 (phase difference when both equal reference voltage Vref) is designated R3.

Figure 10:
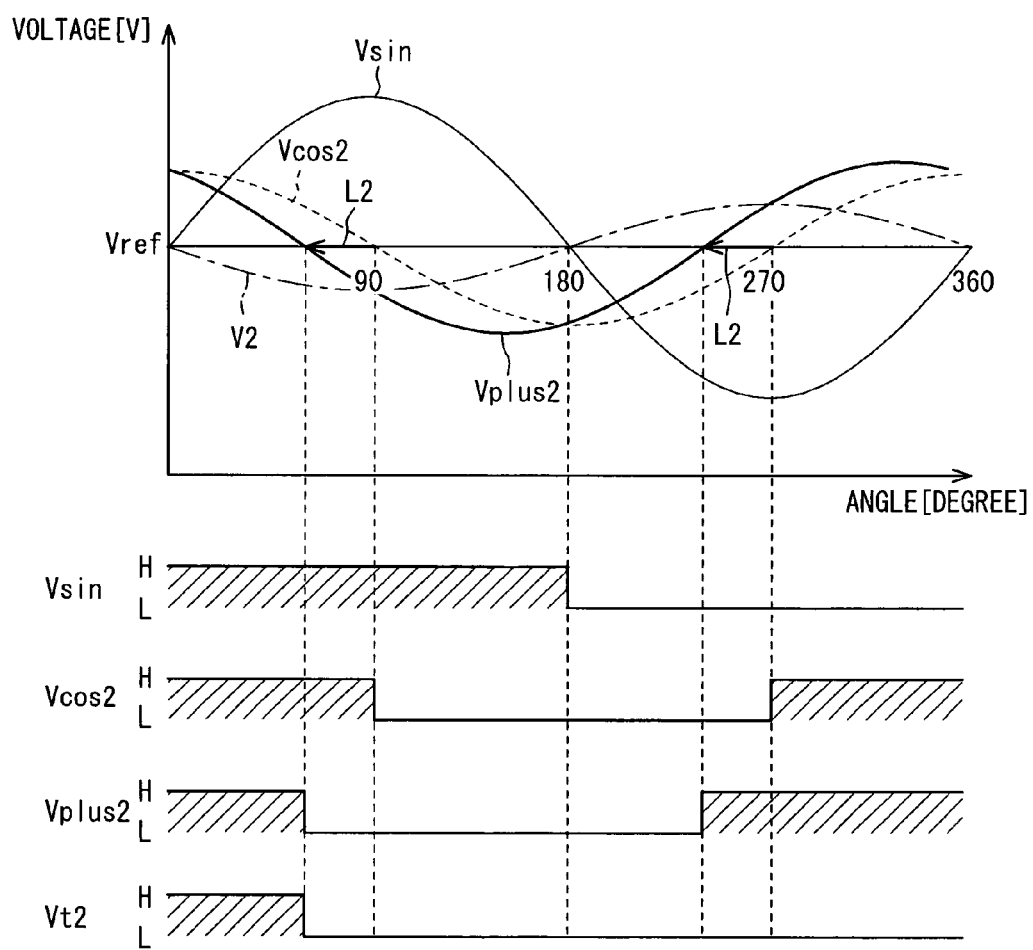
FIG. 10 is an explanatory graph showing the secondary added waveform and other waveforms when counterclockwise torque is applied to the torque transmission shaft (steering shaft)
Figure 11:
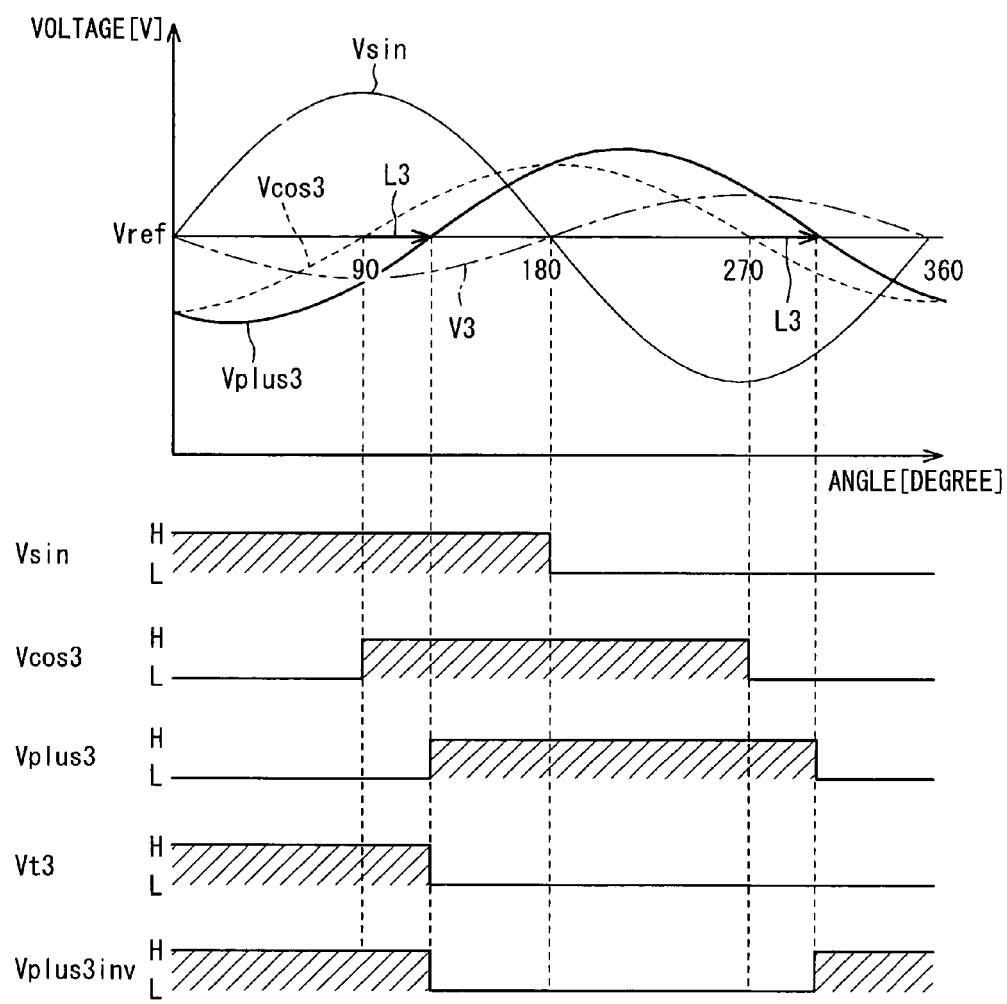
FIG. 11 is an explanatory graph showing the tertiary added waveform and other waveforms also when counterclockwise torque is applied to the torque transmission shaft (steering shaft)

When counterclockwise torque is applied to the steering shaft 36, the secondary added waveform and other waveforms become as shown in FIG. 10 and the tertiary added waveform and other waveforms become as shown in FIG. 11.

As shown in FIG. 10, the secondary output V2 assumes a waveform shifted 180 degrees relative to that when clockwise torque is applied. The phase difference between the secondary cosine wave Vcos2 and the secondary added waveform Vplus2 (phase difference when both equal reference voltage Vref, designated L2) becomes 180 degrees, with the secondary added waveform Vplus2 being shifted in the advance direction relative to the secondary cosine wave Vcos2. As shown in FIG. 11, the tertiary output V3 assumes a waveform shifted 180 degrees relative to that when clockwise torque is applied. The phase difference between the tertiary cosine wave Vcos3 and the tertiary added waveform Vplus3 (phase difference when both equal reference voltage Vref; designated L3) becomes 180 degrees. That is, the tertiary added waveform Vplus3 is shifted in the delay direction relative to the tertiary cosine wave Vcos3.

Figure 12:
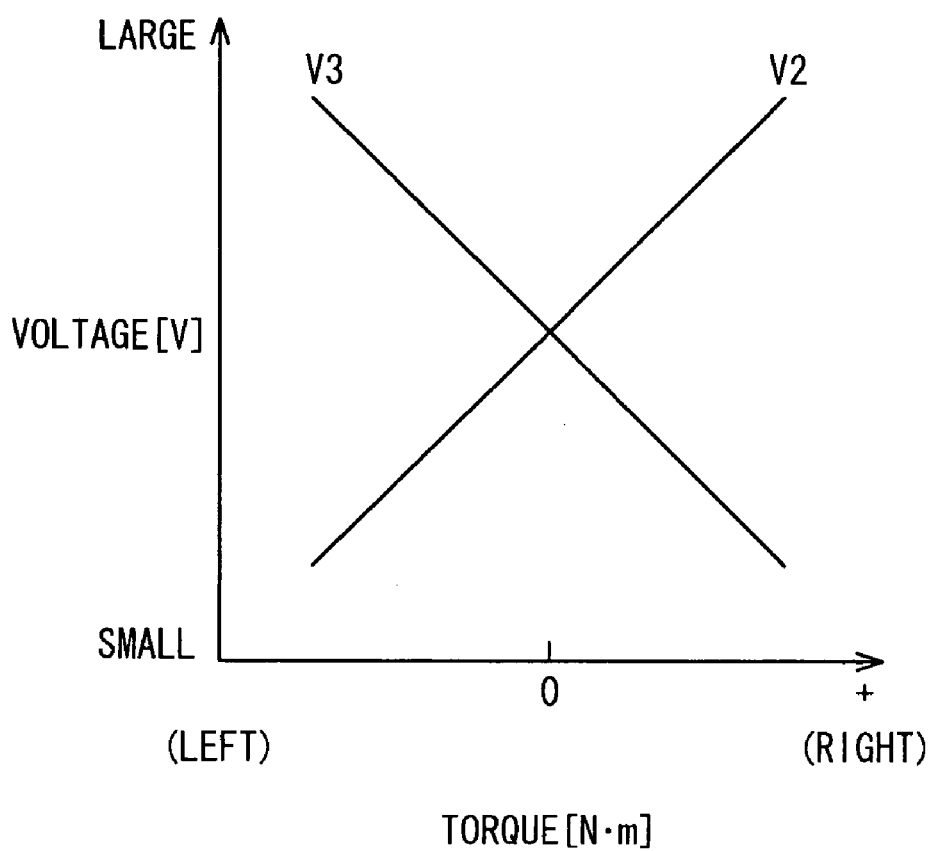
FIG. 12 is an explanatory graph showing characteristics of the secondary detector coil and the tertiary detector coil relative to applied torque.

FIG. 12 shows how the secondary output V2 and tertiary output V3 vary as a function of applied torque. Since, as explained earlier, the secondary detector coil 20 is constituted in negative-to-negative differential connection and the tertiary detector coil 22 is constituted in positive-to-positive differential connection, the secondary output V2 and tertiary output V3 exhibit opposite characteristics with respect to the applied torque.

The direction and magnitude of applied torque can therefore be accurately detected by applying the bias voltages to the secondary output V2 and tertiary output V3 and detecting the direction of phase difference and magnitude of the so-obtained waveforms (i.e., the secondary added waveform Vplus2 and tertiary added waveform Vplus3) and bias voltages (i.e., the secondary cosine wave Vcos2 and tertiary cosine wave Vcos3).

Since the self-induced voltage produced in the exciting coil 16 constitutes an electromotive force acting in the opposite direction from the applied voltage, its phase is 90 degrees different from that of the excitation signal Vsin actually supplied to the exciting coil 16. Use of the waveform obtained by shifting the phase of the excitation signal Vsin 90 degrees therefore maximizes the aforesaid phase difference and makes it possible to obtain the same phase difference with respect to both clockwise and counterclockwise torque. In other words, the torque detection is not only made maximum but is also made equal for torque in either direction.

Figure 13:
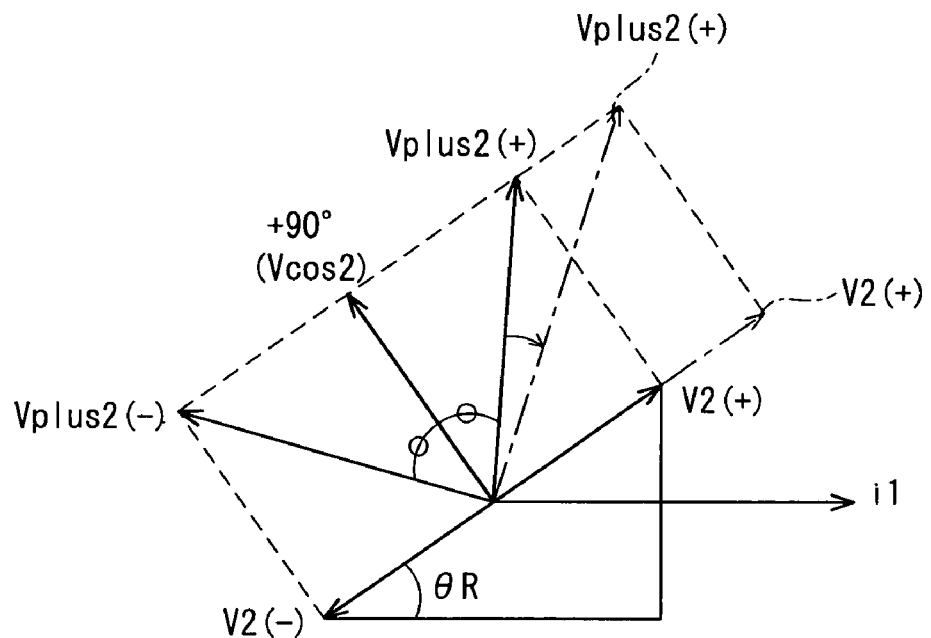
FIG. 13 is an explanatory diagram (phasor diagram) showing the vector composition when the secondary cosine wave is added to the output of the secondary detector coil.
Figure 14:
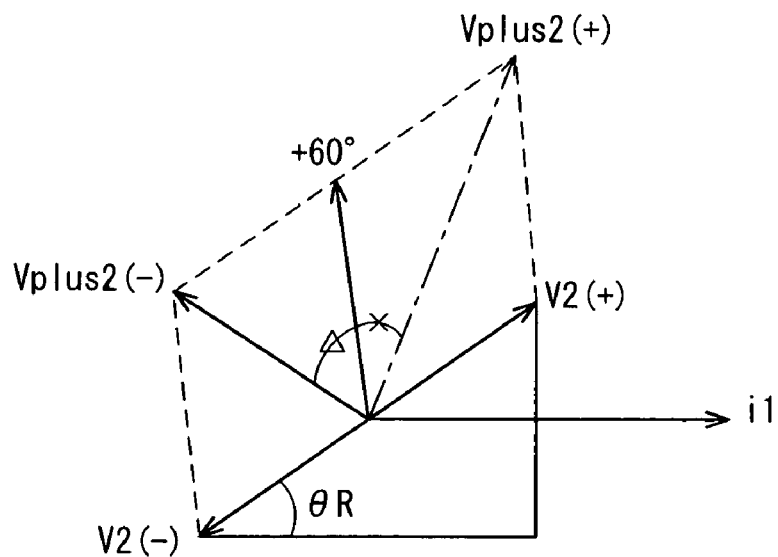
FIG. 14 is an explanatory diagram (phasor diagram) showing the vector composition when a bias voltage phase shifted 60 degrees relative to the excitation signal is added to the output of the secondary detector coil.

This will be explained further with reference to FIGS. 13 and 14. FIG. 13 is an explanatory diagram (phasor diagram) showing the vector composition when the secondary cosine wave Vcos2 is added to the secondary output V2. FIG. 14 is an explanatory diagram (phasor diagram) showing the vector composition when a bias voltage phase shifted 60 degrees relative to the excitation signal Vsin is added to the secondary output V2. In both figures, V2(+) designates the secondary output V2 when clockwise torque is applied to the steering shaft 36 and V2(−) designates the secondary output V2 when counterclockwise torque is applied.

In FIGS. 13 and 14, OR is the phase difference produced by the dc resistance component between the time that the excitation signal is produced and the time that it is actually supplied to the exciting coil 16. Owing to the occurrence of OR, the secondary and tertiary bias voltage generators 80, 82 are configured to shift the phase of the excitation signal Vsin actually supplied to the exciting coil 16 when producing the secondary and tertiary cosine waves Vcos2, Vcos3.

As shown in FIG. 13, addition of the vector representing the secondary cosine wave Vcos2 to the vector representing the secondary output V2 when clockwise torque is applied maximizes the angle, i.e., the phase difference, between the vector (Vplus2(+)) representing the secondary added waveform Vplus2 and the vector representing the secondary cosine wave Vcos2. Moreover, as can be seen from the same figure, the angle and phase difference between the vector representing the secondary added waveform Vplus2 and the vector representing the secondary cosine wave Vcos2 increase as the vector representing the secondary output V2 grows larger with increasing voltage value thereof. In other words, increase/decrease in permeability produced by application of torque can be detected as a voltage value and change in the detected voltage value can be interpreted as phase change.

As shown in FIG. 14, the angle, i.e., phase difference, between the vector representing the secondary added waveform Vplus2 and the vector representing the bias voltage can also be increased by adding a bias voltage of other than 90 degrees, e.g., a bias voltage of 60 degrees, to the vector representing the secondary output V2 when clockwise torque is applied. However, the amount of increase becomes smaller than when adding a secondary cosine wave Vcos2 of 90 degrees.

If the same 60-degree bias voltage is added to the vector (V2(−)) representing the secondary output V2 when counterclockwise torque is applied, the angle between the vector (Vplus2(−)) representing the secondary added waveform Vplus2 and the vector representing the secondary cosine wave Vcos2 becomes different than that when clockwise torque is applied. The amount of phase change (shift) for any given input torque magnitude therefore differs with the direction of the torque, which is disadvantages because it causes inconsistency of the detection sensitivity between clockwise torque and counterclockwise torque.

In contrast, as shown in FIG. 13, the amounts of change in the right and left angles (absolute value of the amount of phase change (shift)) can be made equal by adding a secondary cosine wave Vcos2 of +90 degrees. This in turn makes it possible to achieve the same detection sensitivity with respect to clockwise and counterclockwise torque.

The foregoing explanation also applies to the vector composition of the tertiary output V3 and the tertiary cosine wave Vcos3, except that + and − shown in parentheses in FIGS. 13 and 14 need to be reversed and a vector representing −90 degrees needs to be used in place of the vector representing +90 degrees.

Thus, owing to the fact that bias voltages obtained by shifting the phase of the excitation signal Vsin supplied to the exciting coil 16 by predetermined amounts are added to the outputs V2, V3 of the secondary and tertiary detector coils 20, 22, the phase shift between the results of the additions, i.e., the secondary and tertiary added waveforms Vplus2, Vplus3, and the bias voltages with which they are compared (i.e., the secondary and tertiary cosine waves Vcos2, Vcos3) is made large to enhance the detection sensitivity and thus enhance the torque detection accuracy.

Moreover, owing to the fact that the secondary cosine wave Vcos2 produced by advancing the phase of the excitation signal Vsin 90 degrees and the tertiary cosine wave Vcos3 produced by delaying the phase of the excitation signal Vsin 90 degrees are used as the bias voltages, the phase shifts between the secondary/tertiary added waveform Vplus2/Vplus3 and the secondary/tertiary cosine wave Vcos2/Vcos3 is maximized, whereby the detection sensitivity is further enhanced and the detection accuracy with respect to right and left torque is equalized to still further enhance the detection accuracy. The steering torque applied through the steering wheel 34 by the operator can therefore be accurately detected to further enhance the feel of the power steering.

Figure 15:
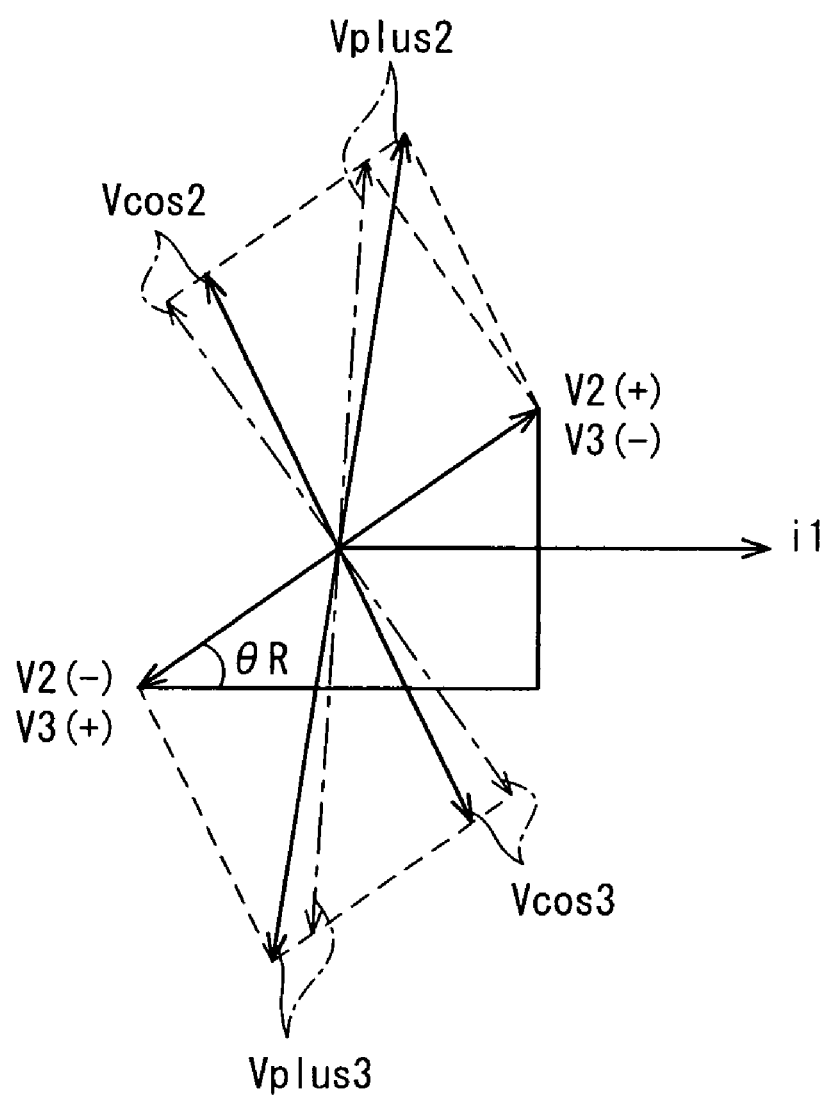
FIG. 15 is an explanatory diagram (phasor diagram) showing the vector composition when the secondary cosine wave and the tertiary cosine wave are added to the output of the secondary detector coil.

The reason for shifting the phase between the secondary cosine wave Vcos2 and the tertiary cosine wave Vcos3 180 degrees (+90 degrees and −90 degrees) is so that even if temperature change or other such disturbance acting on the processing circuit 28 should cause variance in the phases of the secondary cosine wave Vcos2 and the tertiary cosine wave Vcos3, the effects of the disturbance on the secondary and primary sides will cancel out, as shown in FIG. 15, because the vectors of the secondary cosine wave Vcos2 and tertiary cos wave Vcos3 rotate in the same direction.

The explanation of FIG. 3 will be continued. The phase difference (shift) between the secondary added waveform Vplus2 and the secondary cosine wave Vcos2 is detected by a phase comparator 90. Specifically, the excitation signal Vsin and the secondary added waveform Vplus2 are input to a logical product circuit (element), more specifically an AND gate (secondary AND gate; not shown) to obtain a square wave corresponding to the magnitude and direction of the applied torque (i.e., the phase difference between the secondary added waveform Vplus2 and the secondary cosine wave Vcos2). This is defined the secondary detection torque Vt2.

The phase comparator 90 further detects the phase difference (shift) between a waveform obtained by inverting the tertiary added waveform Vplus3 with an unshown inverter (hereinafter called the "inverted tertiary added waveform Vplus3inv") and the tertiary cosine wave Vcos3. Specifically, the excitation signal Vsin and the inverted tertiary added waveform Vplus3inv are input to a logical product circuit (element), more specifically an AND gate (tertiary AND gate; not shown) to obtain a square wave corresponding to the magnitude and direction of the applied torque (i.e., the phase difference between the inverted tertiary added waveform Vplus3inv and the tertiary cosine wave Vcos3). This is defined the tertiary detection torque Vt3. Square waves representing the inverted tertiary added waveform Vplus3inv, secondary detection torque Vt2 and tertiary detection torque Vt3 are shown at the bottom of FIGS. 6 to 11.

As shown in FIGS. 6 to 11, the secondary detection torque Vt2 becomes an H (High) signal (level) when the secondary added waveform Vplus2 and excitation signal Vsin are both equal to or higher than the reference voltage Vref and becomes an L (Low) signal (level) when either is lower than the reference voltage Vref. The tertiary detection torque Vt3 becomes an H signal when the inverted tertiary added waveform Vplus3inv and excitation signal Vsin are both equal to or higher than the reference voltage Vref and becomes an L (Low) signal (level) when either is lower than the reference voltage Vref. The H signal output periods are hatched in FIGS. 6 to 11 for easier understanding.

As can be seen from a comparison of FIGS. 6 and 7, the secondary output V2 and tertiary detection torque Vt3 constantly exhibit the same output when the applied torque is zero. On the other hand, as shown in FIGS. 8 and 9, when clockwise torque is applied, the H signal output period of the secondary detection torque Vt2 is extended and the H signal output period of the tertiary detection torque Vt3 is shortened in proportion to the magnitude of the applied torque. As shown in FIGS. 10 and 11, when counterclockwise torque is applied, the H signal output period of the secondary detection torque Vt2 is shortened and the H signal output period of the tertiary detection torque Vt3 is extended in proportion to the magnitude of the applied torque.

Thus, the H signal output period of the secondary detection torque Vt2 increases and decreases in proportion to the phase difference between the secondary added waveform Vplus2 and the secondary cosine wave Vcos2, i.e., in proportion to the magnitude and direction of the applied torque. Similarly, the H signal output period of the tertiary detection torque Vt3 increases and decreases in proportion to the phase difference between the inverted tertiary added waveform Vplus3inv and the tertiary cosine wave Vcos3, i.e., in proportion to the magnitude and direction of the applied torque. Moreover, since the outputs of the secondary detection torque Vt2 and tertiary detection torque Vt3 change in opposite directions for the same direction of the applied torque, the direction and magnitude of the torque applied to the steering shaft 36 can be accurately detected by using the difference between the two.

As explained earlier, the reference voltage Vref accurately indicates the midpoint of the excitation signal. Therefore, in FIGS. 6 to 11, the midpoints of the secondary cosine wave Vcos2 and tertiary cosine wave Vcos3 obtained by shifting the phase of the excitation signal Vsin by a predetermined amount and the midpoints of the secondary output V2 and tertiary output V3 are also accurately indicated. From this it follows that the midpoints of the secondary added waveform Vplus2 and tertiary added waveform Vplus3 (and inverted tertiary added waveform Vplus3inv) are also accurately indicated.

As a result, the phase difference between the secondary cosine wave Vcos2 and the secondary added waveform Vplus2 and the phase difference between the tertiary cosine wave Vcos3 and the inverted tertiary added waveform Vplus3inv can be accurately detected to enhance the torque detection accuracy. Since the steering torque applied through the steering wheel 34 by the operator can therefore be accurately detected, the feel of the power steering is enhanced. Although the amplitude of the detection waveform is not detected in this embodiment, it is possible to detect the magnitude of the amplitude with good accuracy because, as explained in the foregoing, the torque sensor 10 according to this embodiment enables the midpoint of the detection waveform amplitude to be accurately ascertained.

The explanation of FIG. 3 will be continued. The secondary detection torque Vt2 and tertiary detection torque Vt3 output from the phase comparator 90 are sent through respective CR filters (smoothing circuits) 92, 94 to be smoothed, whereafter they are sent to the ECU 60 and to a differential amplifier 96 that amplifies the aforesaid difference. The output of the differential amplifier 96 is forwarded to the ECU 60 as the final detected torque Vtf.

The ECU 60 uses the final detected torque Vtf (and secondary detection torque Vt2 and tertiary detection torque Vt3) to determine the direction and magnitude of the torque input to the steering shaft 36 (the steering torque).

Thus, as explained in the foregoing, bias voltages obtained by shifting the phase of the excitation signal by predetermined amounts are added to the secondary output V2 and tertiary output V3, the phases of the resulting secondary added waveform Vplus2 and tertiary added waveform Vplus3 (more exactly, the inverted tertiary added waveform Vplus3inv) are compared with the phases of the bias voltages, and the torque is detected from the phase differences. That is, the increase/decrease in permeability produced by torque application is detected as change in voltage value and the change in voltage value is detected as phase. The detection sensitivity is therefore higher than in the case of detecting torque from voltage value change only, and torque detection accuracy is therefore enhanced because influence from noise, such as caused by current passing through the motor 54, is minimal even when the detection voltage is small.

Further, the phase differences are detected based on the secondary output V2 and tertiary output V3 (more exactly, the secondary detection torque Vt2 and tertiary detection torque Vt3 obtained therefrom), whose characteristics are contrary to each other, and the difference therebetween is amplified for torque detection. As a result, the detection sensitivity is increased, the amplification factor of the differential amplifier 96 can be set small, and the effect of noise from other nearby electrical equipment is minimized (i.e., a high S/N ratio can be obtained because noise is not amplified). The torque detection accuracy is therefore further upgraded. In addition, the impact of changes in inductance owing to temperature change and change in the amplification factor of the differential amplifier 96 can be eliminated to realize a stable detection characteristic because these changes are canceled out between the two outputs (phase differences).

Moreover, the bias voltages added to the secondary output V2 and tertiary output V3 are produced by shifting the phase of the excitation signal +90 degrees and −90 degrees. The phase differences of the bias voltages (the secondary cosine wave Vcos2 and tertiary cosine wave Vcos3) relative to the added waveforms (the secondary added waveform Vplus2 and tertiary added waveform Vplus3 (more exactly, the inverted tertiary added waveform Vplus3inv obtained by inverting the tertiary added waveform Vplus3)) are therefore maximized to further improve the detection sensitivity, while the fact that the detection sensitivity is the same even if the torque input direction differs also increases the detection accuracy.

The explanation of FIG. 3 will be continued. The secondary added waveform Vplus2 and the tertiary added waveform Vplus3 (the waveform before inversion by the inverter) are also input to a failure detector 98.

As shown in FIGS. 6, 8 and 10, when the torque sensor 10 is normal, the secondary added waveform Vplus2 always, irrespective of whether or not torque is applied, exhibits an H signal at the instant the voltage value of the excitation signal Vsin rises above the reference voltage Vref (the instant of transition from the lower amplitude side to the upper amplitude side) and always exhibits an L signal at the instant the voltage value of the excitation signal Vsin falls below the reference voltage Vref (the instant of transition from the upper amplitude side to the lower amplitude side). Further, as shown in FIGS. 7, 9 and 11, the tertiary added waveform Vplus3 always, irrespective of whether or not torque is applied, exhibits an L signal at the instant the voltage value of the excitation signal Vsin rises above the reference voltage Vref and always exhibits an H signal at the instant the voltage value of the excitation signal Vsin falls below the reference voltage Vref. When the torque sensor 10 fails, however, this relationship between the outputs occasionally breaks down.

The failure detector 98 therefore detects the secondary added waveform Vplus2 and tertiary added waveform Vplus3 outputs at the rise and fall time points of the excitation signal Vsin. When it finds that a detected value does not satisfy the relationship for it mentioned above, it produces a signal indicating failure of the torque sensor 10 and sends it to the ECU 60. When the failure detector 98 outputs a signal indicating failure of the torque sensor 10, the ECU 60 lights a warning lamp 66 to alert the operator.

Because, as mentioned earlier, the excitation signal Vsin is generated based on the clock frequency (operating frequency) of the ECU 60, the detection of the secondary added waveform Vplus2 and tertiary added waveform Vplus3 at the rise and fall time points of the excitation signal Vsin can be conducted synchronously with the processing operations of the ECU 60. This eliminates delay between the time at which the torque sensor 10 produces an output and the time at which the ECU 60 conducts failure detection. The torque sensor 10 according to this embodiment therefore fully satisfies the requirement of an onboard vehicle sensor to enable failure detection as soon as possible (at the most suitable time).

Moreover, since the detector coils are provided in two channels (i.e., the secondary and tertiary) in such a way that failure of the torque sensor 10 can be detected from their output, it is possible to detect the sensor failure accurately.

Having been described in the above, the embodiment is arranged to have a torque sensor (10), comprising: a magnetic metal film (14) with magnetic anisotropy attached to a torque transmission shaft (12, steering shaft 36); an exciting coil (16) and a detector coil (20, 22) each installed near the magnetic metal film; an excitation power supply source (ECU 60, frequency divider 60a, onboard battery 62, constant-voltage regulator 68) that generates an excitation signal (Vsin) to be supplied to the exciting coil; and a torque detector (28) that is connected to the detector coil and detects a torque applied to the torque transmission shaft (Vt2, Vt3, Vtf) based on an output (V2, V3) of the detector coil when the torque is applied. The characteristic features thereof are that the excitation signal to be supplied to the exciting coil is an ac signal; and a reference voltage generator (72) that is connected to the excitation power supply source to inputs the excitation signal and sends the ac excitation signal whose reference voltage (Vref) indicating a midpoint of the ac excitation signal is set to a voltage corresponding to a 50% duty ratio of the ac excitation signal, to the exciting coil.

Thus, a voltage corresponding to a 50% duty ratio of the excitation power supply is used as the reference voltage indicating the midpoint of the excitation signal composed of an ac signal. This enables supply of a reference voltage that accurately indicates the midpoint of the excitation signal irrespective of error (fluctuation) occurring in the excitation power supply. Even in the case of operation using a mono power supply, therefore, a large-amplitude excitation signal can be generated that is free of upper-lower imbalance with respect to the reference voltage as the midpoint. The torque detection accuracy is enhanced in proportion.

In the sensor, the reference voltage is supplied to the torque detector (28, more precisely phase comparator 90) such that the torque detector detects the applied toque (Vt2, Vt3, Vtf) based on phase of the output of the detector coil when the output of the detector coil coincides with the reference voltage, more specifically, phase difference R2, L2 between the secondary cosine wave Vcos2 and the secondary added waveform Vplus2 detected from the secondary output V2, and phase difference R3, L3 between the tertiary cosine wave Vcos3 and the tertiary added waveform Vplus3 detected from the tertiary output V3.

Thus, torque is detected based on the phase of the detector coil outputs when the detector coil outputs coincide with the reference voltage. The magnitude of the amplitude and the phase of the detection waveform can therefore be accurately detected even in the case of operation using a mono power supply. The torque detection accuracy is enhanced in proportion.

The sensor further includes: a microcomputer (ECU 60) that constitutes the torque detector; and the excitation power supply source has an excitation signal generator (secondary bandpass filter 74, inverting amplifier 76, RC filter 78) that inputs a power supplied from the excitation power supply source and generates the excitation signal based on clock frequency of the microcomputer.

With this, the excitation signal supplied to the exciting coil is produced based on the clock frequency (operating frequency) of the microcomputer. In other words, the excitation signal is generated from a digital signal. Torque detection accuracy is therefore enhanced because a stable excitation signal little affected by temperature change and power supply voltage fluctuation can be supplied. Moreover, since the microcomputer operation and torque sensor operation are synchronized, delay between the time at which the torque sensor 10 produces an output and the time at which the ECU 60 conducts failure detection is eliminated.

In the sensor, excitation signal generator generates a sine wave of predetermined frequency through an analog circuit (secondary bandpass filter 74, inverting amplifier 76, RC filter 78) from a square wave obtained by dividing the clock frequency, and generates the excitation signal (Vsin) from the sine wave.

Thus, an analog circuit is used to produce a sine wave of predetermined frequency from a square wave obtained by dividing the clock frequency of the microcomputer and the excitation signal is produced from the sine wave. The frequency of the square wave input to the analog circuit can therefore be regulated by changing the programming of the microcomputer. Specifically, the frequency of the square wave input to the analog circuit can be set to a value matched to the analog circuit characteristics (particularly the characteristics of a secondary bandpass filter for passing only a predetermined frequency (bandpass filter)) by changing the set value (count value) of a counter for counting the clock frequency so as to change the frequency division ratio. This makes it possible to generate a noise-free excitation signal (sine wave) despite any deviation of the analog circuit characteristics from the specified values. The torque detection accuracy is enhanced in proportion.

The sensor further includes: a second detector coil (22) installed with the detector coil near the magnetic metal film; and a failure detector (98) that is connected to the detector coil and the second detector coil, and detects a failure of the torque based on outputs (V2, V3) of the detector coil and the second detector coil, more specifically, based on the secondary added waveform Vplus2 and the tertiary added wavefrom Vplus3 generated by V2, V3.

With this, a plurality of detector coils and a failure detector are provided, and the failure detector detects torque sensor failure from the outputs of the plurality of detector coils. This configuration enables accurate detection of torque sensor failure in addition to offering the features of the first and second aspects.

The sensor is installed in an electric power steering system powered by an electric motor (54) provided in a vehicle such that torque applied through a steering wheel is detected.

With this, a torque sensor incorporating the features of one of the first to third aspects is installed in an electric power steering system provided in a vehicle, whereby torque applied through a steering wheel by an operator can be accurately detected to enhance the feel of the power steering and, in addition, delay between the time at which the torque sensor produces an output and the time at which the ECU 60 conducts failure detection is eliminated. In the case of the torque sensor according to the second aspect, moreover, generation of a noise-free excitation signal can be ensured by, prior to product shipment, appropriately setting the frequency division ratio in accordance with the deviation of the analog circuit for producing the excitation signal from the design specifications. By this, the torque detection accuracy can be even further improved.

In addition, in the sensor, excitation power supply source includes a frequency divider (60a) whose frequency division ratio is set to be variable. The sensor further including: a second detector coil (22) installed with the detector coil (20) near the magnetic metal film in such a manner that they are wound in opposite directions.

The entire disclosure of Japanese Patent Application Nos. 2002-355732 and 2002-355733 filed on Dec. 6, 2002, including specification, claims, drawings and summary, is incorporated herein in its entirety.

While the invention has been shown and described with reference to specific embodiments, it should be noted that the invention is in no way limited to the details of the described arrangements; changes and modifications may be made without departing from the scope of the appended claims.

What is claimed is:

1. A torque sensor, comprising:
   a magnetic metal film with magnetic anisotropy attached to a torque transmission shaft;
   an exciting coil and a detector coil each installed near the magnetic metal film;
   an excitation power supply source that generates an excitation power having a voltage (Vcc);
   an ac excitation signal generator (74, 76, 78) that is connected to the excitation power supply source to input the excitation power having the voltage (Vcc) and generates an ac excitation signal (Vsin) to be supplied to the exciting coil;
   a reference voltage generator that is connected to the excitation power supply source to input the excitation power having the voltage (Vcc) and generates a reference voltage (Vref), indicating a midpoint of the ac excitation signal (Vsin), that is set to a voltage corresponding to a 50% duty ratio of the excitation power having the voltage (Vcc);
   and
   a torque detector that is connected to the detector coil and detects a torque applied to the torque transmission shaft based on an output of the detector coil when the torque is applied.

2. A torque sensor according to claim 1, wherein the reference voltage is supplied to the torque detector such that the torque detector detects the applied toque based on phase of the output of the detector coil when the output of the detector coil coincides with the reference voltage.

3. A torque sensor according to claim 1, wherein the torque sensor is installed in an electric power steering system powered by an electric motor and provided in a vehicle such that torque applied through a steering wheel is detected.

4. A torque sensor according to claim 1, wherein the excitation power supply source includes a frequency divider whose frequency division ratio is set to be variable.

5. A torque sensor according to claim 4, further including:
   a second detector coil installed with the detector coil near the magnetic metal film in such a manner that they are wound in opposite directions.

6. A torque sensor according to claim 5, wherein coil elements of the exciting coil are in series connection with negative voltage side connected with positive voltage side, and coil elements of the detector coil are in differential connection with their negative voltage sides connected to each other, whilst coil elements of the second coil detector are in differential connection with their positive voltage sides connected to each other.

7. A torque sensor according to claim 1, wherein the output of the detector coil is added by a bias voltage.

8. A torque sensor according to claim 7, wherein the bias voltage is different from the excitation signal by 90 degrees in phase.

9. A torque sensor, comprising:
   a magnetic metal film with magnetic anisotropy attached to a torque transmission shaft;

an exciting coil and a first detector coil each installed near the magnetic metal film;

an excitation power supply source that supplies a power for an excitation signal to be supplied to the exciting coil;

a microcomputer that constitutes a torque detector; and an excitation signal generator that is connected to the excitation power supply source to input the power and generates the excitation signal from the power based on clock frequency of the microcomputer;

wherein, a second detector coil installed with the first detector coil near the magnetic metal film; and a failure detector that is connected to the first detector coil and the second detector coil, and detects a failure of the torque based on outputs of the first detector coil and the second detector coil.

10. A torque sensor according to claim 9, wherein the excitation signal generator generates a sine wave of predetermined frequency through an analog circuit from a square wave obtained by dividing the clock frequency, and generates the excitation signal from the sine wave.

11. A torque sensor according to claim 9, wherein the output of the detector coil is added by a bias voltage.

12. A torque sensor according to claim 9, wherein the torque sensor is installed in an electric power steering system powered by an electric motor and provided in a vehicle such that torque applied through a steering wheel is detected.

13. A torque sensor according to claim 9, further including:

a second detector coil installed with the detector coil near the magnetic metal film in such a manner that they are wound in opposite directions.

14. A torque sensor according to claim 9, wherein coil elements of the exciting coil are in series connection with negative voltage side connected with positive voltage side, and coil elements of the detector coil are in differential connection with their negative voltage sides connected to each other, whilst coil elements of the second coil detector are in differential connection with their positive voltage sides connected to each other.

15. A torque sensor according to claim 11, wherein the bias voltage is different from the excitation signal by 90 degrees in phase.

* * * * *